(12) United States Patent
Hietaniemi et al.

(10) Patent No.: US 10,030,335 B2
(45) Date of Patent: Jul. 24, 2018

(54) FILLER AGGREGATE COMPOSITION AND ITS PRODUCTION

(71) Applicant: KEMIRA OYJ, Helsinki (FI)

(72) Inventors: Matti Hietaniemi, Espoo (FI); Mikko Virtanen, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 15/108,671

(22) PCT Filed: Dec. 17, 2014

(86) PCT No.: PCT/EP2014/078232
§ 371 (c)(1),
(2) Date: Jun. 28, 2016

(87) PCT Pub. No.: WO2015/101499
PCT Pub. Date: Jul. 9, 2015

(65) Prior Publication Data
US 2016/0319485 A1    Nov. 3, 2016

(30) Foreign Application Priority Data

Dec. 30, 2013 (SE) .................................... 1351589

(51) Int. Cl.
| | | |
|---|---|---|
| *D21H 17/37* | (2006.01) | |
| *D21H 11/18* | (2006.01) | |
| *C09C 1/02* | (2006.01) | |
| *D21H 17/67* | (2006.01) | |
| *D21H 17/69* | (2006.01) | |
| *D21H 21/18* | (2006.01) | |
| *D21H 17/25* | (2006.01) | |
| *D21H 17/56* | (2006.01) | |
| *C08L 1/02* | (2006.01) | |
| *C08L 33/26* | (2006.01) | |
| *C08L 39/02* | (2006.01) | |
| *D21H 17/34* | (2006.01) | |

(52) U.S. Cl.
CPC ............... *D21H 11/18* (2013.01); *C08L 1/02* (2013.01); *C08L 33/26* (2013.01); *C08L 39/02* (2013.01); *C09C 1/021* (2013.01); *D21H 17/25* (2013.01); *D21H 17/34* (2013.01); *D21H 17/375* (2013.01); *D21H 17/56* (2013.01); *D21H 17/67* (2013.01); *D21H 17/675* (2013.01); *D21H 17/69* (2013.01); *D21H 21/18* (2013.01); *C01P 2006/22* (2013.01); *C01P 2006/60* (2013.01)

(58) Field of Classification Search
CPC ...... D21H 17/675; D21H 17/37; D21H 17/67; D21H 17/69; D21H 21/18; D21H 11/18; C09C 1/021; C09C 1/02
USPC .......................................................... 162/149
See application file for complete search history.

(56) References Cited

U.S. PATENT DOCUMENTS

2012/0205065 A1    8/2012   Esser
2016/0319487 A1*  11/2016  Hietaniemi ............ D21H 11/18

FOREIGN PATENT DOCUMENTS

| CN | 102660150 B | 2/2014 |
|---|---|---|
| EP | 2 319 984 A1 | 5/2011 |
| EP | 2 662 419 A1 | 11/2013 |
| WO | 2010125247 A2 | 11/2010 |
| WO | 2013089638 A1 | 6/2013 |
| WO | 2013107933 A1 | 7/2013 |

OTHER PUBLICATIONS

Office Action dated Jun. 30, 2014 issued in corresponding Swedish Application No. 1351589-5.
International Search Report and Written Opinion dated Feb. 26, 2015 issued in corresponding International Application No. PCT/EP2014/078232.

* cited by examiner

*Primary Examiner* — Mark Halpern
(74) *Attorney, Agent, or Firm* — Nath, Goldberg & Meyer; Joshua B. Goldberg; Tanya E. Harkins

(57) ABSTRACT

The present invention relates to a filler aggregate composition comprising filler particles of ground calcium carbonate (GCC); a pretreatment agent selected from polyvinylamine (PVAM) and cationic polyacrylamide (CPAM), or a mixture thereof; and a nanofibrillar cellulose (NFC); wherein said filler aggregate composition is in the form of a slurry, wherein said pretreatment agent has an average molecular weight below 6000000 g/mol and a has a charge density below 7 meq/g, determined at pH 7, and the nanofibrillar cellulose is present in an amount of about 0.1-40% of the dry weight of the filler particles. Further it also relates to its method of production, and its use in stocks, paper and paper board.

24 Claims, 2 Drawing Sheets

FILLER AGGREGATE COMPOSITION AND ITS PRODUCTION

This is a National Phase Application filed under 35 U.S.C. 371 as a national stage of PCT/EP2014/078232, filed Dec. 17, 2014, an application claiming the benefit of Swedish Application No. 1351589-5, filed Dec. 30, 2013, the content of each of which is hereby incorporated by reference in its entirety.

TECHNICAL FIELD/FIELD OF THE INVENTION

The present invention relates to a filler aggregate composition and the production thereof, to be used within the pulp and paper industry.

BACKGROUND (OF THE INVENTION)

It has for a long time been a goal of the paper industry to increase the filler content and consequently reduce the fibre content in paper products due to the savings that can be made. The cost of filler is considerably lower than the price of fibres. In addition to cost reductions, an increased amount of fillers may also improve the printability and optical properties of the final paper product. However, using an increased amount of filler may also influence negatively on the paper products. Problems include decrease of the mechanical properties of the paper product. Thus, challenges are found in utilizing more filler in terms of both end product quality and machine runnability. A significant challenge is the loss of strength as the filler disrupts the fibre-fibre bonding network of a sheet by reducing the number of fibres and preventing effective contact of the fibrils. A loss of strength is unfavourable for printing operations as it may cause delamination.

Thus, increasing the binding between fibres and fillers is essential to improve the strength of filled paper.

WO2013/107933 discloses a method for producing paper etc. A stock of fibres is combined with a pretreated filler dispersion comprising mineral filler and cationic pre-treatment agent.

WO2010/125247 discloses a method for preparing aqueous furnish to be used in paper or paper board. The furnish is prepared by addition of filler to a fibre suspension, wherein filler and/or fibres are treated with cationic electrolyte and nanofibrillated cellulose.

Even though different solutions to the problems disclosed above have been presented over the years, there is still a need for new and improved methods and compositions that make it possible to use high contents of filler but without a significant decrease of the strength or other unwanted effects of the final paper product.

SUMMARY (OF THE INVENTION)

The present invention relates to providing a filler aggregate composition which is to be used within the pulp and paper industry to prepare paper products with a high filler load and good mechanical properties. By using a combination of filler, polymer and nanofibrillar cellulose according to the present invention a synergistic effect is obtained of the flocculating properties of a formed aggregate composition.

An object of the present invention is to provide a filler aggregate composition comprising filler particles of ground calcium carbonate (GCC);
a pretreatment agent selected from polyvinylamine (PVAM) and cationic polyacrylamide (CPAM), or a mixture thereof; and
a nanofibrillar cellulose (NFC);

wherein said filler aggregate composition is in the form of a slurry, wherein said pretreatment agent has an average molecular weight below 6 000 000 g/mol and a has a charge density below 7 meq/g, determined at pH 7, and the nanofibrillar cellulose is present in an amount of about 0.1-40% of the dry weight of the filler particles.

In a preferred embodiment the pretreatment agent is cationic polyacrylamide.

According to one embodiment the polyvinylamine has a charge density of 0.05-2 meq/g, determined at pH 7 and an average molecular weight of 2 000 000-5 000 000 g/mol.

According to one embodiment the polyvinylamine has a charge density of 2-7 meq/g, determined at pH 7, and an average molecular weight below 2 000 000 g/mol.

According to one embodiment the polyvinylamine has a product of average molecular weight and charge density of 300 000-7 000 000 meq/mol, preferably 500 000-4 000 000 meq/mol, most preferably 600 000-2 000 000 meq/mol.

According to one embodiment the cationic polyacrylamide has a charge density of 0.05-2 meq/g, preferably 0.2-1.35 meq/g, determined at pH 7, and a molecular weight of 200 000-2 000 000 g/mol.

According to one embodiment the cationic polyacrylamide has a charge density of 0.05-6 meq/g, preferably 0.2-4 meq/g, preferably 0.2-1.4 meq/g, determined at pH 7, and a molecular weight of 200 000-5 000 000 g/mol, preferably 300 000-2 000 000 g/mol, preferably 400 000-900 000 g/mol.

According to one embodiment the pretreatment agent is a linear polymer.

According to one embodiment the pretreatment agent is present in an amount of about 50-1 000 g per ton filler particles, preferably 100-400 g per ton filler particles.

According to one embodiment the nanofibrillar cellulose is present in an amount of about 1-20% of the dry weight of the filler particles, preferably 1.5-10% of the dry weight of the filler particles.

According to one embodiment the aggregates of the filler aggregate composition have an aggregate size distribution defined as mean chord length value which is 10-150% larger than an original chord length value of only filler particles including the ground calcium carbonate, preferably the mean chord length value is 20-100%, preferably 30-60%, preferably about 40% of an original chord length value of only filler particles including the ground calcium carbonate, wherein mean chord length has been measured by Focused Beam Reflectance Measurement.

According to one embodiment the filler aggregate composition has an aggregate floc stability being the ratio of measured chord lengths after and before stirring of over 1000 rpm after flocculation, of at least 70%, preferably at least 80%. According to one embodiment the content of ground calcium carbonate is at least 70% by weight, preferably at least 80% by weight of the filler composition.

According to one embodiment the filler consists solely of ground calcium carbonate.

According to one embodiment the ground calcium carbonate to an extent of 75% have a particle size below 6 μm.

Another object of the present invention is to provide a stock including said filler aggregate composition.

Another object of the present invention is to provide a paper or paper board manufactured using said filler aggregate.

Another object of the present invention is to provide a method for providing said filler aggregate composition for use in paper and board manufacturing, said method including the steps of:
a) providing a filler comprising ground calcium carbonate;
b) providing a slurry of nanofibrillar cellulose;
c) providing a pretreatment agent selected from polyvinylamine or cationic polyacrylamide;
d) combining said filler(s), nanofibrillar cellulose and pretreatment agent in any order forming a filler aggregate composition comprising aggregates.

According to one embodiment the step d) is performed by the nanofibrillar cellulose slurry of step b) first being combined with the filler of step a), and thereafter being combined with the pretreatment agent of step c).

Another object of the present invention is to provide a method for producing paper or paper board comprising the steps of providing said filler aggregate composition and combining said filler aggregate composition with a stock of fibres.

According to one embodiment the filler aggregate composition is added into a thin stock before wet web forming.

According to one embodiment the filler aggregate composition is added after a headbox fan pump.

According to one embodiment the filler aggregate composition is added to the stock of fibres 5-30 seconds before a web forming and retention polymer is added.

According to one embodiment a polymer is added to said stock of fibers at most 3 hour before said filler aggregate composition, preferably the polymer is added to said stock of fibers at most 1 min before said filler aggregate composition. Said polymer may be a web forming polymer.

According to one embodiment the paper machine wire speed is at least 1000 m/min of a paper machine.

Another object of the present invention is to use said filler aggregate composition for the production of super calendered (SC) paper, lightweight coated (LWC) paper, newsprint paper, fine paper, folding boxboard, white top linerboard or white lined chipboard.

SHORT DESCRIPTION OF THE DRAWINGS

DETAILED DESCRIPTION

Figure 1:
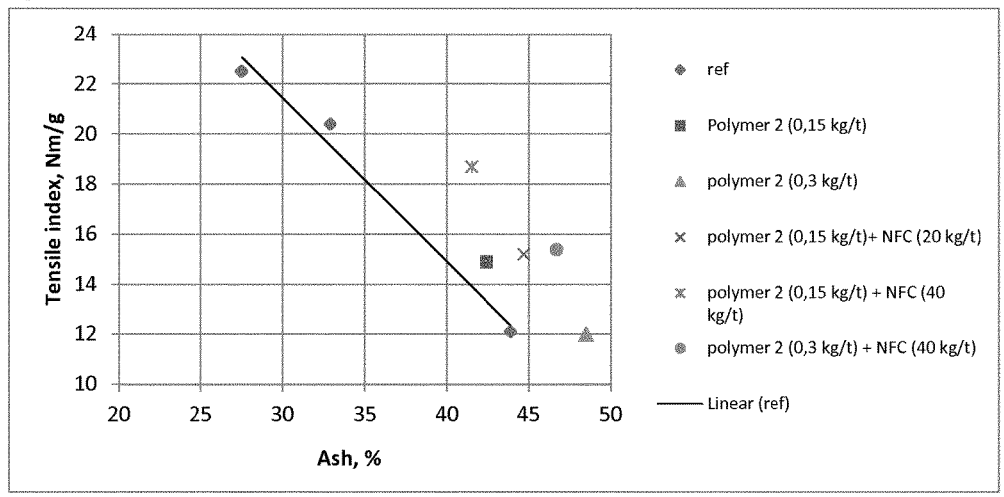
FIG. 1 shows the impact on tensile strength of filler, pretreatment agent and nanofibrillar cellulose, wherein the pretreatment agent is polymer 2 and the NFC is NFC B.

The present invention relates to provide an effective and simple manner for increasing the filler content in paper, board or the like, in order to reduce papermaking costs while maintaining the strength properties and/or optical properties of the produced paper or board.

It has been surprisingly found that by pre-treating a mineral filler formed flocs/aggregates in the formed composition are sufficiently large, i.e. that the mean chord length value increases at least with 10 percent from the original mean chord length value, for effective use in the processes of the pulp and paper industry. It was realised that the optimisation of the size of the formed filler flocs provides unexpected advantages.

The filler aggregate composition according to the present invention comprises a filler comprising ground calcium carbonate (GCC), a pretreatment agent selected from polyvinylamine (PVAM) and cationic polyacrylamide (CPAM), and nanofibrillar cellulose (NFC).

The filler comprising ground calcium carbonate, i.e. the initial filler material provided for use in the present invention, preferably consist to 75% of particles of a particle size below 6 µm, such as about or below 5 µm, or about or below 3.5 µm. The mean particle size (D50) may be 1-4 µm, preferably 1.5 -3 µm, most preferably 1.5 -2 µm. These particle sizes are of the filler particles before it is added to the present process, thus before agglomeration with polymer and NFC.

The filler aggregate composition may optionally contain more than one type of filler which may be used in paper manufacturing. Firstly, the composition comprises ground calcium carbonate (GCC). In addition to that it may also contain other fillers like e.g. precipitated calcium carbonate (PCC), clay, titanium dioxide, synthetic silicate, aluminium trihydrate, barium sulphate, magnesium oxide, kaolin, talcum or gypsum, or mixtures thereof. Preferably, the filler aggregate composition has only ground calcium carbonate (GCC) as sole mineral filler.

The pretreatment agent is a synthetic polymer chosen from cationic polyacrylamide (CPAM) and/or polyvinylamine (PVAM).

In this application the value "average molecular weight" is used to describe the magnitude of the polymer chain length. Average molecular weight values are calculated from intrinsic viscosity results measured in a known manner in 1N NaCl at 25° C. The capillary selected is appropriate, and in the measurements of this application an Ubbelohde capillary viscometer with constant K=0.005228 was used. The average molecular weight is then calculated from intrinsic viscosity result in a known manner using Mark-Houwink equation $[D]=K \cdot M^a$, where [D] is intrinsic viscosity, M molecular weight (g/mol), and K and are parameters given in Polymer Handbook, Fourth Edition, Volume 2, Editors: J. Brandrup, E. H. Immergut and E. A. Grulke, John Wiley & Sons, Inc., USA, 1999. In the case Ubbehold-MW is less than 1 000 000, a GPH HPCL-SEC analyze with PEO referencepolymer calibration was used.

The pretreatment agent have an average molecular weight (MW) of below 6 000 000 g/mol, e.g. about 200 000-5 000 000 g/mol. The charge density of the pre-treatment agent is below 7 meq/g, e.g. about 0.05-7 meq/g, determined at pH 7, measured by titration with Mütec PCD instrument with PesNa.

Cationic polyacrylamide may be produced by copolymerising acrylamide with a cationic monomer or methacrylamide with a cationic monomer. The cationic monomer may be selected from the group consisting of methacryloyloxyethyltrimethylammonium chloride, acryloyloxyethyltrimethylammonium chloride, methacrylamidopropyltrimethyl-ammonium chloride, acrylamidopropyltrimethyl ammonium chloride, diallyl-dimethylammonium chloride, dimethylaminoethyl acrylate, dimethylaminoethyl methacrylate, dimethylaminopropylacrylamide, dimethylaminopropylmethacrylamide, or a similar monomer.

According to one embodiment of the invention cationic polyacrylamide is copolymer of acrylamide or methacrylamide with methacryloyloxyethyltrimethyl ammonium chloride. Cationic polyacrylamide may also contain other monomers, as long as its net charge is cationic and it has an acrylamide/methacrylamide backbone. An acrylamide or methacryl-amide based polymer may also be treated after the polymerisation to render it cationic, for example, by using Hofmann or Mannich reactions. Cationic polyacrylamide may be prepared by conventional radical-initiation polymerisation methods. The polymerisation of the cationic polyacrylamide may be performed by using solution polymerisation in water, gel-like solution polymerisation in water, aqueous dispersion polymerisation, dispersion polymerisation in an organic medium or emulsion polymerisation in an organic medium. The cationic polyacrylamide final product may be obtained either as an emulsion in an organic medium, aqueous dispersion, or as solution in water, or as a dry powder or dry granules after optional filtration and drying steps following the polymerisation.

The cationic polyacrylamide may be used as a solution, the dosing concentration of the cationic polyacrylamide being about 0.01-0.5 weight-%, preferably about 0.03-0.1 weight-% in the solution.

The cationic polyacrylamide has preferably an average molecular weight (MW) in the range of about 200 000-2 000 000 g/mol. According to other embodiments the pre-treatment agent is or it comprises cationic polyacrylamide having an average molecular weight (MW) in the range of about 300 000-1 900 000 g/mol, typically about 400 000-1 800 000 g/mol, more typically about 500 000-1 500 000 g/mol, preferably about 600 000-1 200 000 g/mol, more preferably about 700 000-1 000 000 g/mol, such as about 750 000-900 000 g/mol.

The charge density of the cationic polyacrylamide may be about 0.05-7 meq/g, preferably about 0.05-2 meq/g, preferably about 0.2-1.5 meq/g, more preferably about 0.5-1.35 meq/g, such as about 0.5 or about 1.3, determined at pH 7.

Polyvinylamine may also be used according to the present invention.

PVAm may be produced from n-vinyyliformamide and may be partly converted to vinylamine hydrolyzed polymer, thereafter the copolymers of vinylamine and n-vinylformamide and formiate salt are formed.

The polyvinylamine has preferably have an average molecular weight (MW) in the range of 200 000-5 000 000 g/mol. According to other embodiments the pre-treatment agent is or it comprises cationic polyacrylamide having an average molecular weight (MW) in the range of about 200 000-4 500 000 g/mol, typically about 300 000-4 000 000 g/mol.

The charge density of the cationic polyacrylamide is preferably 0.05-7 meq/g, preferably 0.2-6 meq/g, determined at pH 7.

According to one embodiment the polyvinylamine may have a combination of average molecular weight and charge density, wherein the average molecular weight is below 2 000 000 g/mol, e.g. about 200 000-2 000 000 g/mol, preferably about 250 000-1 000 000 g/mol, such as about 300 000-500 000 g/mol, and the charge density is about 2-7 meq/g, preferably about 4-6 meq/g, determined at pH 7.

According to another embodiment the polyvinylamine may have a combination of average molecular weight and charge density, wherein the average molecular weight is above 2 000 000 g/mol, e.g. about 2 000 000-5 000 000 g/mol, preferably about 3 000 000-4 500 000 g/mol, and the charge density is about 0.05-2 meq/g, preferably about 0.2-1.5 meq/g, preferably about 0.5-1 meq/g, determined at pH 7.

According to one embodiment the polyvinylamine may be classified by the product of the average molecular weight and the charge density, i.e. multiplying the average molecular weight with the charge density (MW* charge density). The result obtained when the molecular weight value is multiplied with the charge density value may be about 300 000-7 000 000 meq/mol, preferably 500 000-4 000 000 meq/mol, most preferably 600 000-2 000 000 meq/mol.

As can be seen above the polyvinylamine may be chosen to have an average molecular weight and charge density combination wherein preferably one is in a higher range and the other is in a lower range.

The pre-treatment agent may also be a mixture of the polymers, the first and second polymer having preferably different average molecular weight.

In the case of the pre-treatment agent comprising more than one polymer, any second or following polymer is added simultaneously with the first polymer to the filler composition. Preferably the pre-treatment agent is one single liquid solution comprising at least one of the polymers selected from the two specified above.

The pre-treatment agent may be added to the filler particles in amount of 50-1 000 g/ ton total amount filler, preferably 100-400 g/ton total amount filler. In case two or more different filler are used, the total amount filler comprises the ground calcuim carbonate and any consecutive filler.

The form of the polymer may influence and preferably a linear polymer is used. In some aspects polyvinylamine may be preferable to cationic polyacrylamide.

Nanofibrillar cellulose (NFC) may also be called nanocellulose, nanofibrillated cellulose, cellulose nanofiber, nano-scale fibrillated cellulose, microfibrillar cellulose, cellulose nanofibrils (CNF) or microfibrillated cellulose (MFC) or any wood based fibrillated fibers (SR>75). The NFC fibrills are isolated from the wood-based fibers and the width and length of the NFC fibers vary depending on the specific manufacturing process. A typical width of NFC is from about 3 nm to about 3 µm, preferably from about 3 to about 300 nm, such as from about 3 to about 100 nm, from about 10 to about 300 nm, from about 10 to about 100 nm, or from about 100 to about 300 nm; and a typical length is from about 100 nm to about 700 µm, preferably from about 100 nm to about 200 µm, such as from about 100 nm to about 50 µm, from about 200 nm to about 40 µm, from about 400 nm to about 30 µm, from about 500 nm to about 20 µm, from about 500 nm to about 10 µm, from about 500 nm to about 100 µm, or about 1-50 µm.

The fineness of the NFC used may be defined by the viscosity and transmittance.

The nanofibrillar cellulose is present in an amount of about 0.1-40% of the dry weight of the filler particles, preferably 1-25% of the dry weight of the filler particles, preferably 1-20% of the dry weight of the filler particles, preferably 1.5-10% of the dry weight of the filler particles.

The floc size distribution of the mineral filler is changed with the pre-treatment agent and the nanofibrillar cellulose so that the mean chord length value increases 10-150%, typically 20-100%, preferably 30-60%, such as about 40% from the original mean chord length value. The original mean chord length value is the value measured for only the filler particles used, before any addition of pretreatment agent or nanofibrillar cellulose, and the mean chord length value includes said further addition of pretreatment agent or nanofibrillar cellulose. In this application the term "mean chord length" describes particle size which has been measured by using Focused Beam Reflectance Measurement (FBRM). The FBRM system uses a rotating laser optics design that can determine particle chord lengths by detecting reflected light from the particle. A laser beam is projected through a sapphire window and then the focused rorating laser beam contacts the particle, light is reflected and propagated back through the probe sapphire window. The particle continues to reflect light until the rotating focused beam reaches the opposite edge of the particle. Particle size is measured in terms of a "chord length", which is defined as the distance between two edges of a particle. The chord length (CL) may be presented as the reflected laser signal time ($\Delta t$ (seconds)) multiplied with the scan speed of laser beam ($v_b$ (meters per second)), i.e. $CL=\Delta t*v_b$. All the floc size values in this application have been measured by using Focused Beam Reflectance Measurement (FBRM), the measurement range of the device being 1-1000 μm. Used FBRM apparatus is Lasentec FBRM Model D600L by Laser Sensor Technology, Redmond, Wash., USA, Serial No. 1 106, and its detector is D600L- HC22-K, Serial No. 961. The detector is installed in a DJJ vessel, manufactured by Paper research Materials Inc. and the sample volume is 500 ml. Stirring was performed at a speed of 1000 rpm.

Further, according to the present method, the formed aggregates show an aggregate floc stability of at least 70%, e.g. at least 75%, at least 80%, at least 85% or at least 90%.

The wording floc stability is the ratio of measured chord lengths after and before high shear stirring of the flocculating matter. The flocculation influences the behavour of the matter and high shear forces are obtained upon stirring. Stirring above 1000 rpm after flocculation is considered to give a high shear stirring, preferably stirring of at least 1200 rpm, such as at least 1400 rpm or at least 1500 rpm. The floc stability may be disclosed as the ratio of measured chord lengths after a high shear stirring over 1000 rpm and before a high shear stirring over 1000 rpm, after flocculation. It is to be noted that all components needs to be added before the initial "before" value of the measured chord length can be obtained, i.e. filler, pretreatment agent and NFC needs to be incorporated for the "before" value to be comparable with the "after" value and to be used in the calculation of floc stability. After the addition of the above mentioned components the flocculation is obtained.

The use of a combination of the nanofibrillar cellulose, polymer and filler in accordance with the present invention results in a filler aggregate composition which exhibits synergistic effect of the combination in terms of an increased floc size, when compared to prior art.

The present invention relates to a method for providing a filler aggregate composition for use in paper and board manufacturing, said method including the steps of:
a) providing a filler comprising ground calcium carbonate
b) providing a slurry of nanofibrillar cellulose;
c) providing a pretreatment agent selected from polyvinylamine or cationic polyacrylamide;
d) combining said filler(s), nanofibrillar cellulose and pretreatment agent in any order forming a filler aggregate composition comprising aggregates.

In one embodiment the step d) is performed by the nanofibrillar cellulose slurry of step b) first being combined with the filler of step a), and thereafter being combined with the pretreatment agent of step c).

The pretreatment agent acts on the filler and a surface treated filler is obtained, i.e. the filler particles are surface treated with polymer.

The present invention also relates to a process for making paper comprising adding a polymer to pulp stock before sheet formation to increase at least one paper property selected from retention, drainage rate, or paper dry strength.

Further there is provided a method for producing paper or paper board comprising the steps of providing a filler aggregate composition as disclosed above and combining said filler aggregate composition with a stock of fibres.

The pretreated filler composition may be added into a thin stock before wet web forming. The pretreated filler composition may be added after a headbox fan pump. The pretreated filler composition may be added before the web forming step. The addition to the stock of fibres may be made 5-30 seconds before a web forming and retention polymer is added. The aggregates of the present pretreated filler composition increase the paper strength considerably and, thus, making it possible to increase the production speed of paper products. Using the present composition the paper machine wire speed may be at least 1000 m/min. The paper machine has a hydraulic headbox, in which a high flow speed may destroy the flocs, if the flocs are not shear resistant.

In the paper making process according to the invention also a polymer may be added to said stock of fibers. This is preferably done at most 3 hour before the addition of said filler aggregate composition to the stock. In one embodiment the polymer may be added to said stock of fibers at most 1 min before the addition of said filler aggregate composition.

The present method and product may be used for producing super calendered (SC) paper, ultralight weight coated (ULWC) paper, light weight coated (LWC) paper, medium weight coated (MWC) paper, heavy weight coated (HWC) paper, machine finished coated (MFC) paper, uncoated woodfree (UWF) paper, woodfree coated (WFC) paper, lightweight coated (LWCO) printing paper, SC offset (SCO) printing paper, machine finished specialties (MFS), multi-layer coated paper, inkjet paper, copy paper, newsprint paper, folding boxboard, white top linerboard or white lined chipboard. The invention is preferably used for producing super calendered (SC) paper, lightweight coated (LWC) paper, newsprint paper, fine paper, folding boxboard, white top linerboard or white lined chipboard.

EXAMPLES

1. General Principle of Conducting Focused Beam Reflectance Measurement (FBRM) Tests:

The test stock used was composed of fillers from a paper mill and diluting water (tap water).

The filler was treated in the form of slurry with the desired solids content. The pretreatment polymer and NFC to be examined was added to the filler in the form of diluted aqueous slurry in 1% concentration. Filler pretreatment tests were conducted with a Focused Beam Reflectance Measurement (FBRM) apparatus. Used FBRM apparatus was Lasentec FBRM Model D600L by Laser Sensor Technology, Redmond, Wash., USA, Serial No. 1106, and its detector was D600L-HC22-K, Serial No. 961. The FBRM instrument is a flocculation analyzer that uses a highly focused laser beam and back-scattered geometry as a principle of operation. From the collected data the FBRM instrument yields chord size distribution, mean of the chord size values and the number of particles detected. The measurement range of the device is adjusted to 1-1000 μm.

2. Influence of Different Polymers and NFC Alone

The tests used the following step-wise procedure.
 1. At moment 0 s and at stirring rate of 1000 rpm a filler sample diluted to 1% consistency (500 ml) was poured into a dynamic drainage jar DDJ (by Paper Research Materials Inc.),
2. At moment 15 s pretreatment polymer was dosed into the filler slurry,
3. At moment 30 s NFC was dosed into the filler slurry,
4. At moment 45 s mean particle size (D50)=mean chord length was measured,
5. At moment 50 s stirring rate 1000→1500 rpm,
6. At moment 60 s stirring rate 1500→1000 rpm,
7. At moment 75 or 69 s mean particle size (D50)=mean chord length was measured.

It is to be noted that stirring at 50 s-60 s is considered to be stirring at high shear. Floc stability is the ratio of measured chord lengths after and before high shear. The high shear is a result of the stirring of the flocs that are obtained in the process. In this specific example the floc stability may be calculated as a percentage as follows (100*chord length at 69 or 75 s/chord length at 45 s).

The polymers tested were:
Polymer 1 is LiqStarch, a starch in slurry form which is used as a reference,
Polymer 2 is a CPAM with 800 000g/mol (low molecular weight), 1.3 meq/g (high charge density),
Polymer 3 a CPAM micro polymer with 6-8 Mg/mol (high molecular weight) and 1.3 meq/g (high charge density) tree dimensional structure,
Polymer 4 is a CPAM with 6.4 Mg/mol (high molecular weight) and 0.5 meq/g (at pH 7) (low charge density),
Polymer 5 is a PVAM with 4 Mg/mol (high molecular weight) and 4.3 meq/g (at pH 7) (high charge density),
Polymer 6 a PVAM with 300 000 g/mol (low molecular weight) and 5.8 meq/g (at pH 7) (high charge density),
Polymer 7 is a PVAM with 4 Mg/mol (high molecular weight), 0.6 meq/g (at pH 7) (low charge density).
The polymers 3 and 4 are present for comparison.

PVAMs more effective to increase floc size at lower dosage than CPAM-LMW-HC
Best floc stabilities are found amongst the PVAMs and CPAM-LMW-HC
NFC don't agglomerate alone (test no 19)

3. Influence of NFC

Two NFC with different fineness was tested. Fineness was determined trough measurements of viscosity and transmittance using following procedures.

The shear viscosity was measured by Physica MCR301 rheometer of Anton Paar, plate-plate geometry, at a shear rate 1.0 1/s. The measurements were performed at 1.5% dry solids, at a temperature of 25° C.

Transmittance was measured by Perkin Elmer Lambda 900 UV-VIS spectrophotometer at 0.1% sample consistency. The samples were well dispersed into Milli-Q water before testing with propel mixer for 10 minutes at 300 rpm and then with ultrasound mixing at 50% amplitude for one minute. Samples were analysed immediately after dispersing so that no flocculation or sedimentation would take place. The transmittance was measured at wavelength 800 nm.

TABLE 2

| Sample | Viscosity, mPas-s | Transmittance, % |
| --- | --- | --- |
| A | 34000 | 71 |
| B | 9400 | 34 |

Transmittance: The transparency increases while particle size decreases.

Viscosity: The viscosity increases while particle size decreases.

Sample B is a more coarse material than A, which is shown by the low viscosity and transmittance values.

TABLE 1

| | dosage kg/t | mean chord length at 45 s, μm | mean chord length at 75 s, μm | size increase, % | size increase with shear, % | floc stability, % |
| --- | --- | --- | --- | --- | --- | --- |
| 1 ref 1 | | 5.7 | 5.9 | | | |
| 2 polymer 1 | 0.5 | 8.2 | 6.6 | 45.4 | 13.0 | 80.7 |
| 3 polymer 1 | 1 | 10.3 | 8.1 | 82.1 | 37.8 | 78.6 |
| 4 polymer 1 | 1.5 | 11.7 | 9.1 | 106.8 | 55.5 | 78.1 |
| 6 polymer 2 | 0.2 | 7.2 | 6.2 | 26.4 | 6.4 | 87.4 |
| 7 polymer 2 | 0.3 | 8.2 | 6.8 | 44.8 | 15.6 | 82.8 |
| 8 polymer 2 | 0.5 | 9.9 | 7.4 | 74.1 | 26.8 | 75.6 |
| 10 polymer 3 | 0.2 | 19.1 | 13.4 | 236.7 | 128.0 | 70.3 |
| 11 polymer 3 | 0.3 | 23.9 | 15.6 | 322.3 | 165.5 | 65.3 |
| 13 polymer 4 | 0.2 | 17.8 | 12.0 | 214.7 | 104.9 | 67.6 |
| 14 polymer 4 | 0.3 | 23.7 | 14.9 | 319.4 | 153.1 | 62.6 |
| 15 ref 2 | | 3.4 | 3.4 | | | |
| 16 polymer 5 | 0.2 | 5.8 | 5.4 | 71.1 | 58.5 | 92.6 |
| 17 polymer 6 | 0.2 | 4.6 | 4.6 | 35.9 | 35.9 | 100.0 |
| 18 polymer 7 | 0.2 | 5.0 | 4.6 | 46.8 | 35.9 | 92.6 |
| 19 NFC no polymer | 10% | 3.4 | 3.4 | 0.0 | 0.0 | 100.0 |

From table 1 it can be seen that
Polymer 2 is shown best of tested CPAM's. Agglomerates with low dosages but not too strongly also floc stability is good >80%

The same test procedure as above was performed. The two different NFC qualities were diluted to 1% consistency. Dosage of NFC was kg/t of filler composition dry. Polymer dosage was g/t of filler composition dry.

TABLE 3

| | NFC type, dosage 50 kg/t | polymer 2 dosage kg/t | mean chord length at 45 s, μm | mean chord length at 75 s, μm | size increase, % | size increase with shear, % | floc stability, % |
|---|---|---|---|---|---|---|---|
| 1 | | | 5.7 | 5.9 | | | |
| 6 | | 0.2 | 7.2 | 6.2 | 26.4 | 6.4 | 87.4 |
| 7 | | 0.3 | 8.2 | 6.8 | 44.8 | 15.6 | 82.8 |
| 8 | | 0.5 | 9.9 | 7.4 | 74.1 | 26.8 | 75.6 |
| 19 | A | | 8.2 | 7.0 | 45.1 | 18.7 | 85.0 |
| 20 | A | | 10.6 | 8.1 | 86.8 | 37.6 | 76.5 |
| 21 | A | | 12.0 | 8.6 | 111.8 | 46.4 | 71.7 |
| 22 | B | | 10.1 | 8.5 | 78.4 | 44.3 | 83.9 |

From the table 3 it can be seen that:
NFC improves the flocking behavior. NFC B is slightly better than NFC A.
From table 1 (test no 19) it can be seen that by adding only NFC to GCC don't increase the floc size at all. This is showing that NFC has flocculating properties only in combination with polymer. There seems to be a synergistic effect for the flocculation with using the specific combination of polymer and cellulose.
NFC does not seem to have a large impact on the floc stability. There it is only shown a slight increase for NFC B.

4. Influence of Dosing Order

Same test procedure as above, but the mean chord length after shear was measure at 69 s. Polymers used for these tests were PVAms.
GCC 10 g/l
Polymer 0.2 kg/(t filler) dry
NFC B 10%
Addition interval 15 sec

TABLE 4

| | | mean chord length at 45 s, μm | mean chord length at 69 s, μm | size increase, % | size increase with shear, % | floc stability, % |
|---|---|---|---|---|---|---|
| 15 | ref 2 | 3.4 | 3.4 | | | |
| 19 | NFC | 3.4 | 3.4 | 0.0 | 0.0 | 100.0 |
| 16 | Polymer 5 | 5.8 | 5.4 | 71.1 | 58.5 | 92.6 |
| 17 | Polymer 6 | 4.6 | 4.6 | 35.9 | 35.9 | 100.0 |
| 18 | Polymer 7 | 5.0 | 4.6 | 46.8 | 35.9 | 92.6 |
| 23 | Polymer 5 + NFC | 5.4 | 5.0 | 58.5 | 46.8 | 92.6 |
| 24 | Polymer 6 + NFC | 4.3 | 4.3 | 25.9 | 25.9 | 100.0 |
| 25 | Polymer 7 + NFC | 5.0 | 4.6 | 46.8 | 35.9 | 92.6 |
| 26 | NFC + Polymer 5 | 7.9 | 6.3 | 132.6 | 84.8 | 79.4 |
| 27 | NFC + Polymer 6 | 5.4 | 5.4 | 58.5 | 58.5 | 100.0 |
| 28 | NFC + Polymer 7 | 6.8 | 5.8 | 99.5 | 71.1 | 85.8 |

From the table 4 it can be seen that:
NFC alone doesn't aggregate at all.
If NFC is added before the polymer there is a strong synergistic effect for the flocculation.
Preferred dosing order depends on the target agglomerate mean chord length and used polymer (paper quality, particle size of GCC)

5. Paper Strength 1

General principle of conducting paper strength hand sheet tests with Rapid Köthen hand sheet former:
Test sequence for stock preparation (Mixing (1000 rpm) in dynamic drainage jar DDJ (by Paper Research Materials Inc). The tests used the following step-wise procedure.

1. At moment 0 s and at stirring rate of 1000 rpm a GCC filler sample diluted to 1% consistency was poured into a dynamic drainage jar DDJ (by Paper Research Materials Inc.), 2. At moment 10 s pretreatment polymer was dosed into the filler slurry, 3. At moment 20 s NFC was dosed into the filler slurry, 4. At moment 40 s birch pulp was dosed into the filler slurry, 5. At moment 50 retention polymer, 1 kg/t as dry, was dosed into the filler slurry, 6. At moment 55 s colloidal silica, 2.3 kg/t as dry, was dosed into the filler slurry, 7. At moment 60 s the start of hand sheet preparation,

TABLE 5

| | Viscosity, mPas-s | Transmittance, % |
|---|---|---|
| NFC B | 9400 | 34 |

GCC filler (75% <3 micron particles) was diluted to 1% concentration before addition and dosing amount was adjusted based on final ash content of paper sheet. Strength polymer was added to the filler slurry in the form of diluted aqueous solution in 0.1% concentration. Used strength polymer is copolymer of acrylamide and Q9 and has charge of 10 mol-% and molecular weight of 0.8 Mg/mol (based on Ubbehold capillary viscometer). NFCs were diluted to 1% concentration before addition with tap water. Bleached birch kraft pulp was diluted to 0.5% concentration with tap water. Retention aid, cationic polyacrylamide (charge approx. 1 meq/g and molecular weight 6 Mg/mol) and colloidal silica (particle size 5 nm) were used as retention aids.

Hand sheets were prepared with Rapid-Köthen hand sheet former according to the standard ISO 5269-2:2004. Targeted grammage of hand sheets was 100 g/m$^2$.

Measured tensile strength, Scott bond, light scattering and ash content values were determinated according to the standards ISO 1924-2:2008, T 560, ISO 9416:2009 and ISO 1762:2001.

TABLE 6

| Trial point | Polymer 2 (kg/t GCC as dry) | NFC B (kg/t GCC as dry) | GCC content in paper % | Tensile Index (Nm/g) | Scott Bond (J/m$^2$) | Light Scattering, 420 nm (m$^2$/kg) |
|---|---|---|---|---|---|---|
| 1 | | | 27.5 | 22.5 | 122 | 58.8 |
| 2 | | | 32.9 | 20.4 | 96 | 63.5 |
| 3 | | | 43.9 | 12.1 | 77 | 71.2 |
| 4 | 0.15 | | 42.4 | 14.9 | 55 | 73.4 |
| 5 | 0.3 | | 48.5 | 12.0 | 68 | 79.7 |
| 6 | 0.15 | 20 | 44.7 | 15.2 | 101 | 73.4 |
| 7 | 0.15 | 40 | 41.5 | 18.7 | 119 | 72.5 |
| 8 | 0.3 | 40 | 46.7 | 15.4 | 100 | 78.3 |

Figure 2:
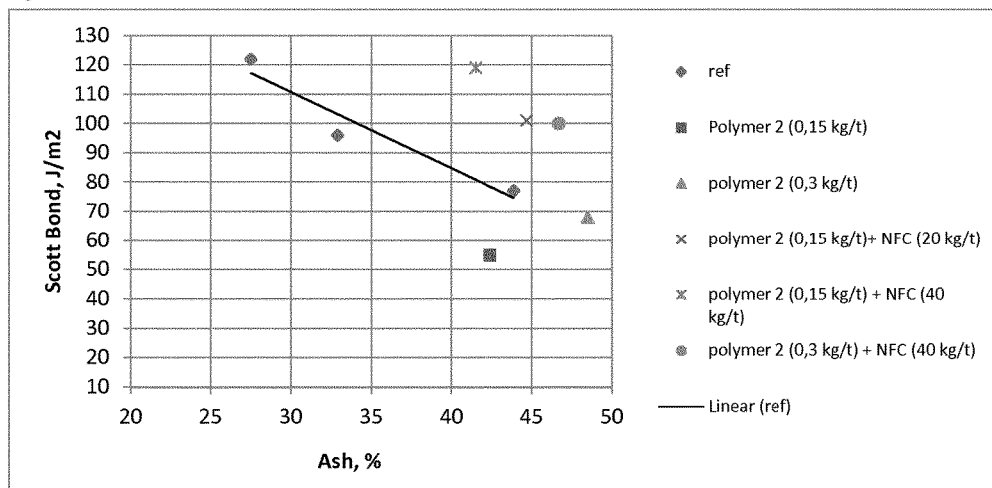
FIG. 2 shows the impact on internal bond strength of filler, pretreatment agent and nanofibrillar cellulose, wherein the pretreatment agent is polymer 2 and the NFC is NFC B.
Figure 3:
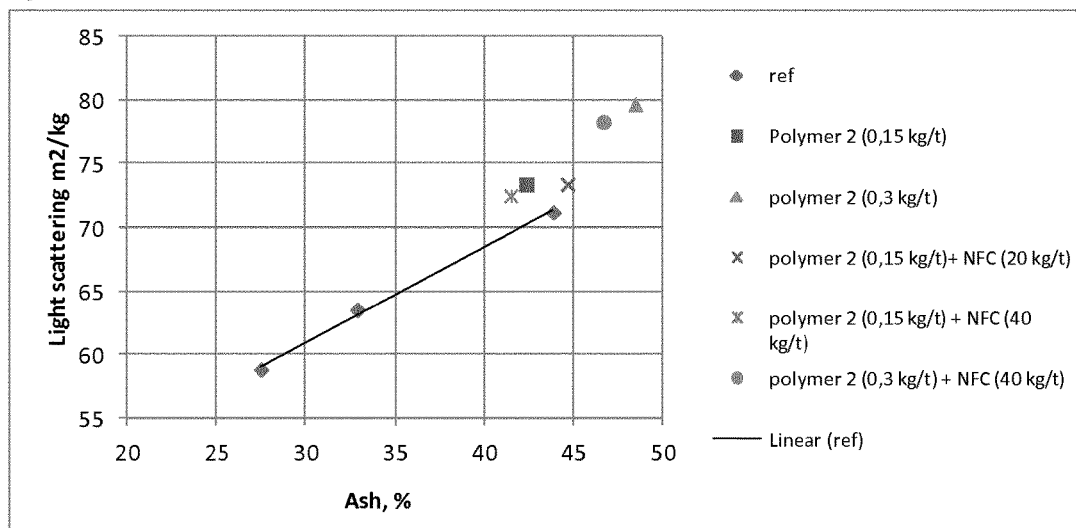
FIG. 3 shows the impact on the optical properties of filler, pretreatment agent and nanofibrillar cellulose, wherein the pretreatment agent is polymer 2 and the NFC is NFC B.

The values are shown in FIGS. 1-3.

From the table it can be seen that NFC content in the pretreated filler composition improves paper strength properties. (Ash % in figures=GCC content in paper in the table).

Based on the above and FIGS. 1-3, one may clearly see that the composition of strength polymer, NFC and filler according to the present invention gives:

Same tensile strength with 8%-units higher filler content

Same internal bond strength with 11-14%-units higher filler content

Higher strength properties without sacrificing optics

6. Paper Strength 2

General principle of conducting paper strength hand sheet tests with Rapid Köthen hand sheet former:

Test sequence for stock preparation (Mixing (1000rpm) in dynamic drainage jar DDJ (by Paper Research Materials Inc). The tests used the following step-wise procedure.
1. At moment 0 s and at stirring rate of 1000 rpm a GCC filler sample diluted to 1% consistency was poured into a dynamic drainage jar DDJ (by Paper Research Materials Inc.),
2. At moment 10 s pretreatment polymer was dosed into the filler slurry,
3. At moment 20 s NFC was dosed into the filler slurry,
4. At moment 40 s birch pulp was dosed into the filler slurry,
5. At moment 50 retention polymer, 0.1 kg/t as dry, was dosed into the filler slurry,
6. At moment 55 s colloidal silica, 0.23 kg/t as dry, was dosed into the filler slurry,
7. At moment 60 s the start of hand sheet preparation.

TABLE 7

| Sample | Viscosity, mPas-s, 10 rpm, 1.5% conc. | Transmittance, %, 800 nm, 0.1% conc. |
|---|---|---|
| MFC A | 34000 | 71 |

A GCC filler (75% <3micron particles was diluted to 1% concentration before addition and dosing amount was adjusted based on final ash content of 30% in paper sheet. Strength polymer was added to the filler slurry in the form of diluted aqueous solution in 0.1% concentration. Used strength polymer is copolymer of acrylamide and Q9 and has charge of 3.5 mol-% and molecular weight of 6 Mg/mol (based on Ubbehold capillary viscometer). NFCs were diluted to 1% concentration before addition with tap water. Bleached birch kraft pulp was diluted to 0.5% concentration with tap water. Retention aid, cationic polyacrylamide (charge approx. 1 meq/g and molecular weight 6 Mg/mol) and colloidal silica (particle size 5 nm) were used as retention aids.

Hand sheets were prepared with Rapid-Köthen hand sheet former according to the standard ISO 5269-2:2004. Targeted grammage of hand sheets was 100 g/m$^2$.

Measured was the tensile strength, Scott bond, and ash content values were determinated according to the standards ISO 1924-2:2008, T 560 and ISO 1762:2001.

TABLE 8

| Trial point | Polymer 4 (kg/t GCC as dry) | NFC A (kg/t GCC as dry) | Tensile Index (Nm/g) | Scott Bond (J/m$^2$) |
|---|---|---|---|---|
| 1 | | | 18.9 | 85 |
| 2 | 0.15 | 40 | 22.3 | 123 |
| 3 | 0.3 | 40 | 23.9 | 148 |

From table 8 it can be seen that the NFC content in the pretreated filler composition improves paper strength properties.

Based on table 8, one may clearly see that the composition of strength polymer, NFC and filler according to the present invention gives:

26% higher tensile strength in constant filler content

74% higher Scott bond in constant filler content

From the above examples it one can see that the filler, pretreatment agent and nanofibrillar cellulose according to the present invention shows synergistic effects when combined into the filler aggregate composition upon use in the production of pulp and paper.

The invention claimed is:

1. A filler aggregate composition, comprising:
   filler particles of ground calcium carbonate (GCC) having a mean particle size (D$_{50}$) of 1-4 µm;
   a pretreatment agent selected from polyvinylamine (PVAM) and cationic polyacrylamide (CPAM), or a mixture thereof; and
   a nanofibrillar cellulose (NFC);
   wherein the filler aggregate composition is in the form of a slurry,
   wherein the pretreatment agent has an average molecular weight below 6 000 000 g/mol and has a charge density below 7 meq/g, determined at pH 7, and
   wherein the nanofibrillar cellulose is present in an amount of 0.1-40% by weight of the dry weight of the filler particles.

2. The filler aggregate composition according to claim 1, wherein the polyvinylamine has
a charge density of 0.05-2 meq/g, determined at pH 7 and an average molecular weight of 2 000 000-5 000 000 g/mol.

3. The filler aggregate composition according to claim 1, wherein the polyvinylamine has
a charge density of 2-7 meq/g, determined at pH 7, and an average molecular weight below 2 000 000 g/mol.

4. The filler aggregate composition according to claim 1, wherein the polyvinylamine has a product of average molecular weight and charge density of 300 000-7 000 000 meq/mol.

5. The filler aggregate composition according to claim 4, wherein the polyvinylamine has a product of average molecular weight and charge density of 500 000-4 000 000 meq/mol.

6. The filler aggregate composition according to claim 5, wherein the polyvinylamine has a product of average molecular weight and charge density of 600 000-2 000 000 meq/mol.

7. The filler aggregate composition according to claim 1, wherein the cationic polyacrylamide has
a charge density of 0.05-2 meq/g, determined at pH 7, and a molecular weight of 200 000-2 000 000 g/mol.

8. The filler aggregate composition according to claim 7, wherein the cationic polyacrylamide has a charge density of 0.2-1.35 meq/g, determined at pH 7.

9. The filler aggregate composition according to claim 1, wherein aggregates of the filler aggregate composition have an aggregate size distribution defined as mean chord length value which is 10-150% larger than an original chord length value of only filler particles including the ground calcium carbonate.

10. The filler aggregate composition according to claim 9, wherein aggregates of the filler aggregate composition have an aggregate size distribution defined as mean chord length value which is 20-100% larger than an original chord length value of only filler particles including the ground calcium carbonate.

11. The filler aggregate composition according to claim 10, wherein aggregates of the filler aggregate composition have an aggregate size distribution defined as mean chord length value which is 30-60% larger than an original chord length value of only filler particles including the ground calcium carbonate.

12. The filler aggregate composition according to claim 11, wherein aggregates of the filler aggregate composition have an aggregate size distribution defined as mean chord length value which is about 40% larger than an original chord length value of only filler particles including the ground calcium carbonate.

13. The filler aggregate composition according to claim 1, having an aggregate floc stability, being the ratio of measured chord lengths after and before stirring over 1000 rpm after flocculation, of at least 70%.

14. The filler aggregate composition according to claim 13, having an aggregate floc stability of at least 80%.

15. A stock including the filler aggregate composition according to claim 1.

16. A paper or paper board manufactured using the filler aggregate composition according to claim 1.

17. The filler aggregate composition according to claim 1, wherein the cationic polyacrylamide has
a charge density of 0.05-6 meq/g, determined at pH 7, and a molecular weight of 200 000-5 000 000 g/mol.

18. A method for providing the filler aggregate composition according to claim 1 for use in paper and board manufacturing, the method including the steps of:
a) providing a filler comprising ground calcium carbonate having a mean particle size ($D_{50}$) of 1-4 µm;
b) providing a slurry of nanofibrillar cellulose;
c) providing a pretreatment agent selected from polyvinylamine or cationic polyacrylamide;
d) combining the filler(s), nanofibrillar cellulose and pretreatment agent in any order forming a filler aggregate composition comprising aggregates,
wherein the nanofibrillar cellulose is present in the composition in an amount of 0.1-40% by weight of the dry weight of the filler particles.

19. The method according to claim 18, wherein step d) is performed by the nanofibrillar cellulose slurry of step b) first being combined with the filler of step a), and thereafter being combined with the pretreatment agent of step c).

20. A method for producing paper or paper board comprising the steps of providing the filler aggregate composition according to claim 1 and combining the filler aggregate composition with a stock of fibers to form a pretreated filler composition.

21. The method according to claim 20, wherein the pretreated filler composition is added into a thin stock before wet forming.

22. The method according to claim 20, wherein the pretreated filler composition is added after a headbox fan pump.

23. The method according to claim 20, wherein the pretreated filler composition is added to the stock of fibers 530 seconds before a web forming and retention polymer is added.

24. The method according to claim 20, wherein a paper machine wire speed is at least 1000 m/min.

* * * * *